United States Patent
Scudder et al.

(10) Patent No.: US 7,602,796 B2
(45) Date of Patent: Oct. 13, 2009

(54) METHOD AND APPARATUS FOR BORDER GATEWAY PROTOCOL ROUTE MANAGEMENT AND ROUTING POLICY MODELING

(75) Inventors: John Scudder, Ann Harbor, MI (US);
David D. Ward, Somerset, WI (US);
Thomas P. Barron, Minneapolis, MN (US)

(73) Assignee: Cisco Technology, Inc., San Jose, CA (US)

( * ) Notice: Subject to any disclaimer, the term of this patent is extended or adjusted under 35 U.S.C. 154(b) by 642 days.

(21) Appl. No.: 11/073,351

(22) Filed: Mar. 4, 2005

(65) Prior Publication Data

US 2006/0209851 A1    Sep. 21, 2006

(51) Int. Cl.
*H04L 12/28* (2006.01)
(52) U.S. Cl. .................. 370/401; 370/392; 709/238
(58) Field of Classification Search .............. None
See application file for complete search history.

(56) References Cited

U.S. PATENT DOCUMENTS 7,139,242 B2 * 11/2006 Bays .................... 370/238

| | | | |
|---|---|---|---|
| 2002/0065599 A1 * | 5/2002 | Hameleers et al. | 701/117 |
| 2004/0006640 A1 * | 1/2004 | Inderieden et al. | 709/242 |
| 2006/0056411 A1 * | 3/2006 | Badat et al. | 370/392 |
| 2007/0140128 A1 * | 6/2007 | Klinker et al. | 370/238 |

OTHER PUBLICATIONS

John G. Scudder, et al., "Multisession BGP", Network Working Group Internet Draft, Expiration Date: Nov. 2004, May 2004.
Y. Rekhter, et al., "A Border Gateway Protocol 4 (BGP-4)", Network Working Group Request for Comments: 1771, Mar. 1995.
T. Bates, et al., "Multiprotocol Extensions for BGP-4", Network Working Group Request for Comments: 2858, Jun. 2000.
E. Chen, "Route Refresh Capability for BGP-4", Network Working Group Request for Comments: 2918, Sep. 2000.

* cited by examiner

*Primary Examiner*—Duc C Ho
(74) *Attorney, Agent, or Firm*—Hickman Palermo Truong & Becker LLP

(57) ABSTRACT

A method and apparatus is described for Border Gateway Protocol (BGP) route management and routing policy modeling. In one aspect, the performance of one or more actions associated with one or more routes is disallowed. One or more routing policies associated with the one or more routes are configured. The performance of the one or more actions is then allowed. In one feature of the aspect, the one or more actions comprise forwarding packets on the one or more routes. The one or more actions may also comprise advertising the one or more routes to BGP peers.

31 Claims, 3 Drawing Sheets

METHOD AND APPARATUS FOR BORDER GATEWAY PROTOCOL ROUTE MANAGEMENT AND ROUTING POLICY MODELING

FIELD OF THE INVENTION

The present invention generally relates to network route management. The invention relates more specifically to a method and apparatus for Border Gateway Protocol (BGP) route management and routing policy modeling.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Border Gateway Protocol (BGP) is a peer-to-peer routing protocol the latest version of which, BGP-4, is defined in RFC1771 that was published by the Internet Engineering Task Force (IETF) in March 1995. BGP is an exterior gateway protocol that is used to exchange routing information among network elements (usually routers) in the same or different autonomous systems. A computer host that executes one or more BGP processes is typically referred to as a BGP host or a BGP device. In order to exchange routing information, two BGP hosts, or peers, first establish a transport protocol connection with one another. The transport connection may be established over a Transport Layer protocol, such as Transmission Control Protocol (TCP) or Stream Control Transmission Protocol (SCTP). Once the transport connection is established, the BGP peers establish a BGP session by exchanging a series of messages that define the parameters of the session.

After the BGP session is established, the BGP peers exchange, or advertise, all their routing information. Thereafter, only updates or changes to the routing information are advertised between the BGP peers. The BGP peers maintain the exchanged routing information during the existence of the BGP session, and when the BGP session is closed or terminated for whatever reason, the routing information received during the session is typically discarded.

The routing information exchanged between BGP peers includes routes to address destinations in one or more networks. A route comprises an address prefix of the destination (also referred to as prefix), and attributes that describe the path to the destination. At a BGP host, routes are stored in a Routing Information Base (RIB). A BGP RIB usually includes three parts: (a) Adj-RIBs-In, which stores routes received from BGP peers or learned from other protocols, (b) Loc-RIB, which stores routes that the BGP host has selected by applying its local policies to the routes stored in Adj-RIBs-In, and (c) Adj-RIBs-Out, which stores routes that the BGP host has selected for advertisement to its BGP peers. The BGP RIB may be implemented as a single physical routing table that includes each of the three parts as separate logical tables, as separate physical routing tables, or as some combination of one or more logical and/or physical routing tables.

The routes that a BGP host stores in Adj-RIBs-In may be received over a BGP session established with a BGP peer, or over any other routing protocol that is configured and is executing on the BGP host. The routes stored in the Loc-RIB of the BGP host are selected from the routes from Adj-RIBs-In by applying one or more route selection and/or route configuration algorithms. The routes selected by the BGP host and stored in the Loc-RIB usually represent the best paths to the routes' respective destinations. Once the best route to a certain destination is selected and stored in the Loc-RIB, the BGP host advertises the route to its BGP peers by placing, or storing, the route in Adj-RIBs-Out. The BGP host may also select some or all of the Loc-RIB routes and store them in a Forwarding Information Base (FIB). The FIB is a physical or logical table that stores routes used to forward packets to the address destinations of the stored routes.

A BGP host may utilize a variety of path selection and/or path configuration algorithms in making its decision whether to select a route that is stored in the Adj-RIBs-In and/or Loc-RIB. The algorithms may be based on a variety of criteria associated with the attributes of a route including, but not limited to, accessibility of the next hop in the path of the route, the weight assigned to the route by the BGP host, the identity of the network element serving as an exit point from the autonomous system for the route, the identity of the network element from which the route was learned (and/or received), the identity and/or location of the network element that is the next hop in the path, the type of routing protocol over which the route was received, the number of hops to the destination of the route, and the network address of the network element that is the next hop in the path.

The path selection and/or path configuration algorithms utilized by a BGP host are usually a part of a routing policy that is configured at the BGP host. A routing policy is a definition of what mechanisms are used for providing access control and flexible routing of network traffic at a network element, such as a router. One or more routing policies are usually defined to configure the network element to inspect and modify the attributes of the routes stored in its routing tables. A routing policy may be configured as specific to one network element, or may be a global autonomous-system-wide routing policy that is configured on all network elements in the network. The definition of the routing policy determines how routes are processed by the network element or elements. For example, at a BGP host, routing protocols such as BGP make routing decisions to advertise, aggregate, discard, distribute, export, hold, import, redistribute, and otherwise modify routes based on one or more parameters of configured routing policies. Thus, a BGP host may apply different routing policies to different sets of routes in the BGP RIB, and may apply different routing policies to the different routing protocols that the BGP host may be executing.

A BGP host, however, always applies its routing policies to the routes that are currently stored in the RIB. This presents a problem since a BGP host has no way of knowing what routes it will receive before a BGP session is established or during the lifetime of the session. In particular, the BGP host does not have the capability to select, configure, and fine-tune a routing policy for routes in the RIB before actually deploying the policy. This often leads to incorrect route selection, propagation of incorrect routes through advertisement, and forwarding packets on incorrect routes. Furthermore, since the BGP host has no way of screening the routes it receives from its peers, it often ends up running path selection and/or path configuration algorithms on routes with unexpected or unwanted prefixes and paths, thus wasting time and valuable processing resources.

One past approach for configuring a routing policy or defining a policy "model" is to initially apply a default routing policy to the routes in the RIB, and consequently tweak the policy by using a trial-and-error technique. For example, once a BGP peering session is established and routes are received over the session, a default policy is applied to these received routes. Usually, a network administrator reviews the received routes and the information obtained as a result of applying the default routing policy to the routes, and makes changes to some or all of the parameters configured for the default routing policy. The changed routing policy is applied again to the routes, the results are reviewed, and the parameters of the policy are modified again. This trial-and-error process continues until an acceptable routing policy is finally configured.

The trial-and-error approach for routing policy configuration has some serious disadvantages. One serious disadvantage of this approach is that it fails to prevent incorrect route selection, incorrect route advertisement, and forwarding packets on incorrect routes while the policy configuration process is taking place at a BGP host. Another serious disadvantage is that this approach may take a long time to configure an acceptable routing policy, and thus may adversely affect the performance of the BGP host with respect to traffic forwarding and route advertisement.

Based on the foregoing, there is a clear need for a technique that overcomes the disadvantages and problems described above, and that allows for flexible route screening, for BGP session interaction, and for robust routing policy modeling and configuration.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
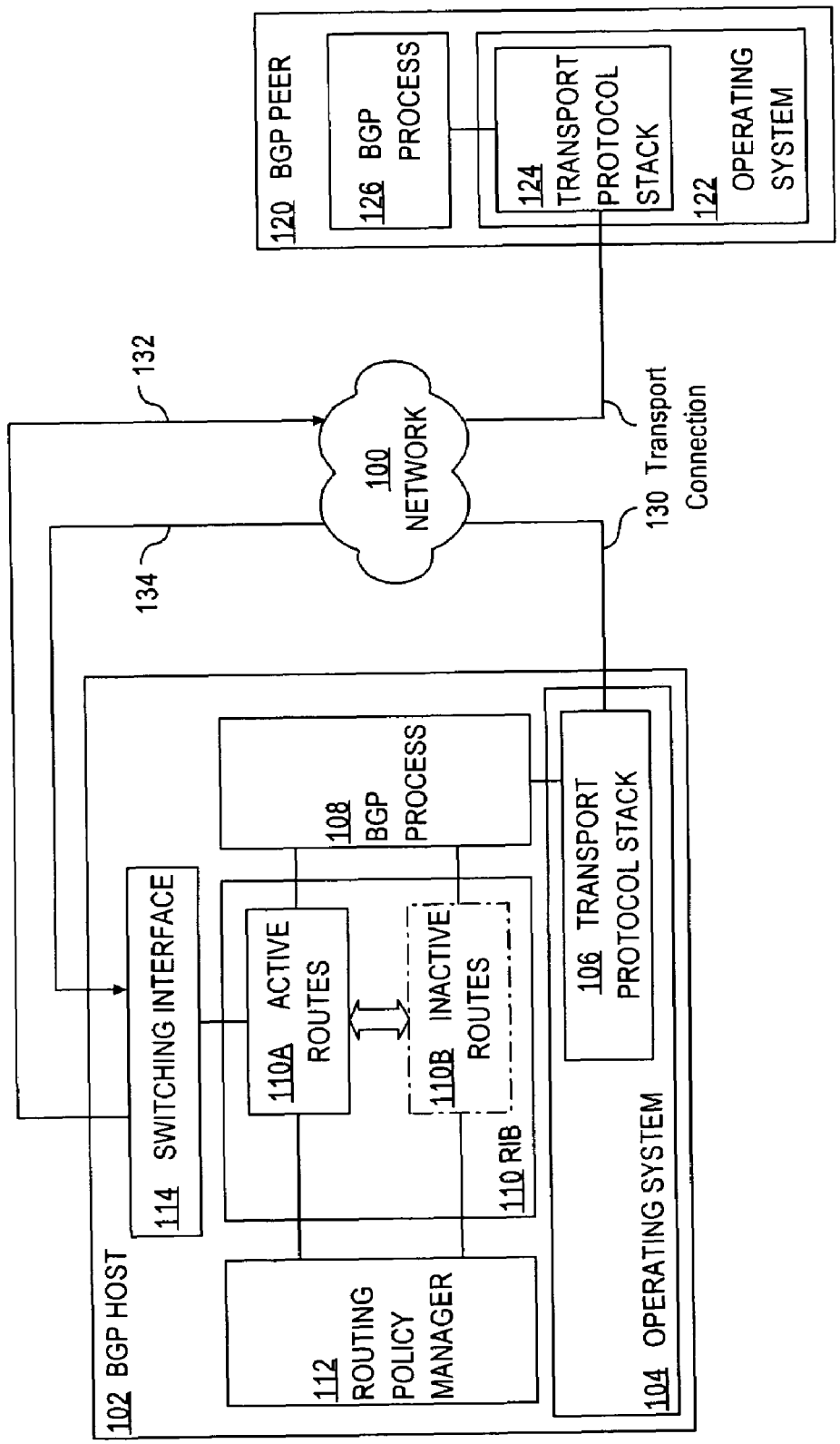
FIG. 1 is a block diagram that illustrates a structural overview of an operational context according to one embodiment.

A method and apparatus for Border Gateway Protocol (BGP) route management and routing policy modeling is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
   2.1 An Example of an Operational Context for an Embodiment
   2.2 A Functional Overview of an Embodiment
3.0 Method for Route Management and Routing Policy Modeling
   3.1 Defining Active and Inactive States for BGP Routes
   3.2 Implementing the Active and Inactive States
   3.3 Active and Inactive Route States for New and Existing BGP Sessions
   3.4 Configuring Routes and Routing Policies in the Inactive State
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method for managing routes at a BGP host. The performance of one or more actions that are associated with one or more routes is disallowed. One or more routing policies that are associated with the one or more routes are configured. The performance of the one or more actions is then allowed for the one or more routes. In a feature of this aspect, the one or more actions comprise forwarding packets on the one or more routes. The one or more actions may also comprise advertising the one or more routes to BGP peers of the BGP host.

In a feature of the aspect, the BGP host receives the one or more routes and stores them in a BGP Routing Information Base (RIB). The BGP host may receive the one or more routes over a BGP session established with a BGP peer, or may receives the one or more routes over a routing protocol that is different than BGP.

In one feature of the aspect, configuring the one or more routing policies comprises modifying one or more attributes of a particular route of the one or more routes based on whether one or more conditions associated with a particular routing policy are satisfied.

In a feature of the aspect, a fee is charged to an entity that uses the BGP host for forwarding network traffic of the entity on the one or more routes. For example, an Internet Service Provider (ISP) may be using the BGP host to route traffic on the one or more routes for a customer, such as a corporation or university. The traffic may be originating from, or may be forwarded to, address destinations in the customer network, or the traffic may be transit traffic to or from the customer network. The fee may be based on the network bandwidth associated with the one or more routes, or on the volume of network traffic that passes on the routes.

In one feature of the aspect, an account record is updated, where the account record is associated with an entity that uses the BGP host for forwarding network traffic of the entity on the one or more routes. The account record is stored in a database, and the update represents charging a fee to an account of the entity. The entity may be a customer, an ISP, or an individual for which the autonomous system, in which the BGP host is established, provides routing, packet forwarding, or transit traffic services.

In one aspect, a method for managing routes is described. A BGP session with a BGP peer is established at a BGP host. The BGP host stores one or more routes that are received over the BGP session. The one or more routes are placed in an inactive state, where packet forwarding is not allowed on any route that is in the inactive state. One or more routing polices associated with the one or more routes are configured. The one or more routes are subsequently placed in the active state, where packet forwarding is allowed on any route in the active state. In a feature of this aspect, in addition to or instead of disallowing packet forwarding on any route in the inactive state, the inactive state does not allow for route advertising of any route that is placed in this state. In this feature, in addition to or instead of allowing packet forwarding on any route in the active state, the active state allows for route advertising of any route that is placed in this state.

In a feature of the aspect, a second BGP session is established between the BGP host and its BGP peer. The one or more routes received over the first session is a first copy of the routes that is in the inactive state. A second copy of the one or more routes is received over the second BGP session, and the second copy of the one or more routes is placed in an active state. One or more routing policies are applied to the first copy of the one or more routes in order to determine the preferred routing policy for the routes. Based on information obtained as a result of applying the one or more routing policies to the first copy of the routes, a particular routing policy is selected as the preferred routing policy. The particular routing policy is then applied to the second copy of the one or more routes, which are in the active state.

In one feature of the aspect, a second copy of the one or more routes is stored at the BGP host. A first routing policy is applied to the first copy of the one or more routes, and a second routing policy is applied to the second copy of the one or more routes. Based on the results obtained from applying the first routing policy and the second routing policy, one of the two routing policies may be selected as the preferred, or best, routing policy for the one or more routes.

In a feature of this aspect, one or more routing policies are applied to the one or more routes. A particular routing policy of the one more routing policies is selected and is used to govern routing on the one or more routes when the routes are placed in the active state.

In one feature of the aspect, configuring the one or more routing policies comprises modifying one or more attributes of a particular route of the one or more routes according to the parameters of one or more routing policies. Configuring the one or more routes may also comprise filtering out, or discarding, a particular route of the one or more routes based on a particular routing policy of the one or more routing policies.

In a feature of this aspect, the step of configuring the one or more routing policies comprises selecting a particular route of the one or more routes based on at least one routing policy that is applied to the one or more routes. In this feature, the step of placing the one or more routes in the active state comprises placing only the selected particular route in the active state.

In one feature of the aspect, a command to modify one or more attributes of a particular route of the one or more routes is received from a user. The one more attributes of the particular route are modified based on a parameter included in the command.

In a feature of this aspect, the BGP peer of the BGP host is also configured to support routes in the active and the inactive states. In this feature, the BGP host advertises one or more routes that are in the inactive state and that have been configured according to one or more routing policies. The BGP peer receives the one or more configured routes and places them in the inactive state. The BGP peer then applies at least one routing policy of the one or more routing polices to these routes while they are in the inactive state.

In one feature of the aspect, the step of placing the one or more routes in the inactive state comprises changing the value of an attribute associated with each route of the one or more routes, where the changed value indicates that each route is in the inactive state. Similarly, the step of placing the one or more routes in the active state also comprises changing the value of the attribute for each route to indicate that each route is in the active state. In this feature, the attribute may be a flag that allows for only two values (active value and inactive value), or may be an attribute, such as a status code, that can hold more that just two values.

In a feature of this aspect, the steps of placing the one or more routes in the inactive state and placing the one or more routes in the active states comprise storing the one or more routes in separate routing tables, where one routing table stores only active routes and a separate routing table stores only inactive routes.

In other aspects, the invention encompasses a computer apparatus and a computer-readable medium configured to carry out the foregoing steps.

2.0 Structural and Functional Overview 2.1 An Example of an Operational Context for an Embodiment FIG. 1 is a block diagram that illustrates a structural overview of an operational context according to one embodiment. As depicted in FIG. 1, although both BGP host 102 and BGP peer 120 execute a BGP process, only BGP host 102 is configured for implementing the techniques of an embodiment. In a different operational context, however, BGP peer 120 may also be configured for implementing the techniques of an embodiment described herein.

BGP host 102 and BGP peer 120 are communicatively connected over network 100. BGP host 102 executes operating system 104. Operating system 104 includes transport protocol stack 106, which provides transport connection services to BGP process 108, and to any other processes, such as other routing protocols, that are being executed by BGP host 102. Similarly, BGP peer 120 executes operating system 122. Operating system 122 includes transport protocol stack 124, which provides transport connection services to BGP process 126.

In operation, BGP process 108 and BGP process 126 establish a BGP session over transport connection 130. During the BGP session, BGP process 108 submits any messages for BGP process 126 to a first transport protocol stack 106, the first transport protocol stack 106 sends the messages over transport connection 130 to a second transport protocol stack 124, and the second transport protocol stack delivers the messages to BGP process 126. Similarly, BGP process 126 submits any messages for BGP process 108 to transport protocol stack 124, transport protocol stack 124 sends the messages over transport connection 130 to transport protocol stack 106, and transport protocol stack 106 delivers the messages to BGP process 108. In one embodiment, transport protocol stacks 106, 124 operate according to TCP and maintain a TCP session over transport connection 130. In a different embodiment, transport protocol stack 106, 124 operate according to SCTP and maintain a SCTP association over transport connection 130.

At BGP host 102, routing policy manager 112 and BGP process 108 are communicatively and/or operatively connected to Routing Information Base (RIB) 110. RIB 110 includes an active routes table 110A and an inactive routes table 110B. Routing policy manager 112 stores and maintains one or more routing policies for BGP host 102. Further, routing policy manager 112 may apply routing policies to routes in both the active routes table 110A and inactive routes table 110B. In the embodiment depicted in FIG. 1, routing policy manager 112 is a separate process executing outside operating system 104. In other embodiments, however, routing policy manager 112 may be executed by BGP host 102 as part of operating system 104.

In the embodiment depicted in FIG. 1, active routes 110A and inactive routes 110B are separate logical tables of RIB 110. In other embodiments, active routes 110A and inactive routes 110B may be stored in the same table of RIB 110 and may be distinguished by the value of an attribute associated with the routes. Thus, the embodiment depicted in FIG. 1, which shows active routes table 110A and inactive routes table 110B as separate logical tables is to be regarded in an illustrative rather than a restrictive sense.

In operation, when BGP process 108 receives one or more routes, it stores the routes in inactive routes table 110B. The routes in inactive routes table 110B are then configured by performing one or more actions on them. For example, routing policy manager 112 may apply one or more routing policies to the inactive routes in order to find and/or configure a preferred routing policy. In addition or besides any actions performed by routing policy manager 112, BGP process 108 may run one or more path selections and/or path configuration algorithms to select the best routes. Moreover, a user may see the routes in inactive routes table 110B and/or execute one or more commands against them through a router management system, such as a Command Line Interface (not shown in FIG. 1).

In the embodiment depicted in FIG. 1, while the routes in inactive routes table 110B are being configured, no forwarding of packets is performed by BGP host 102 on any routes stored in table 110B. When the configuration of the routes in inactive routes table 110B is completed, or when BGP host 102 otherwise decides that the inactive routes are acceptable, BGP process 108 and/or policy routing manager 112 transfers the inactive routes in active routes table 110A.

Switching interface 114 is communicatively and/or operatively connected to active routes table 110A. Switching interface 114 may use the routes in active routes table 110A to forward network traffic, for example, by receiving packets on inbound interface 134 and by routing the packets to outbound interface 132. As depicted in FIG. 1, inbound interface 134 and outbound interface 132 are both connected to network 100. In other embodiments, however, depending on the utilization of BGP host 102, interfaces 132 and 134 may be connected to different networks.

In other operational contexts, according to some embodiments, while the inactive routes are being configured, the inactive routes may not be advertised by a BGP host to its BGP peers. In other embodiments, while the inactive routes are being configured, they may not be forwarded upon and may not be advertised by the BGP host. In addition, in some embodiments the performance of one more actions besides forwarding and advertising may be disallowed for inactive routes. Thus, the operational context depicted in FIG. 1 and the embodiments described with respect to it are to be regarded in an illustrative rather than a restrictive sense.

2.2 A Functional Overview of an Embodiment

Figure 2:
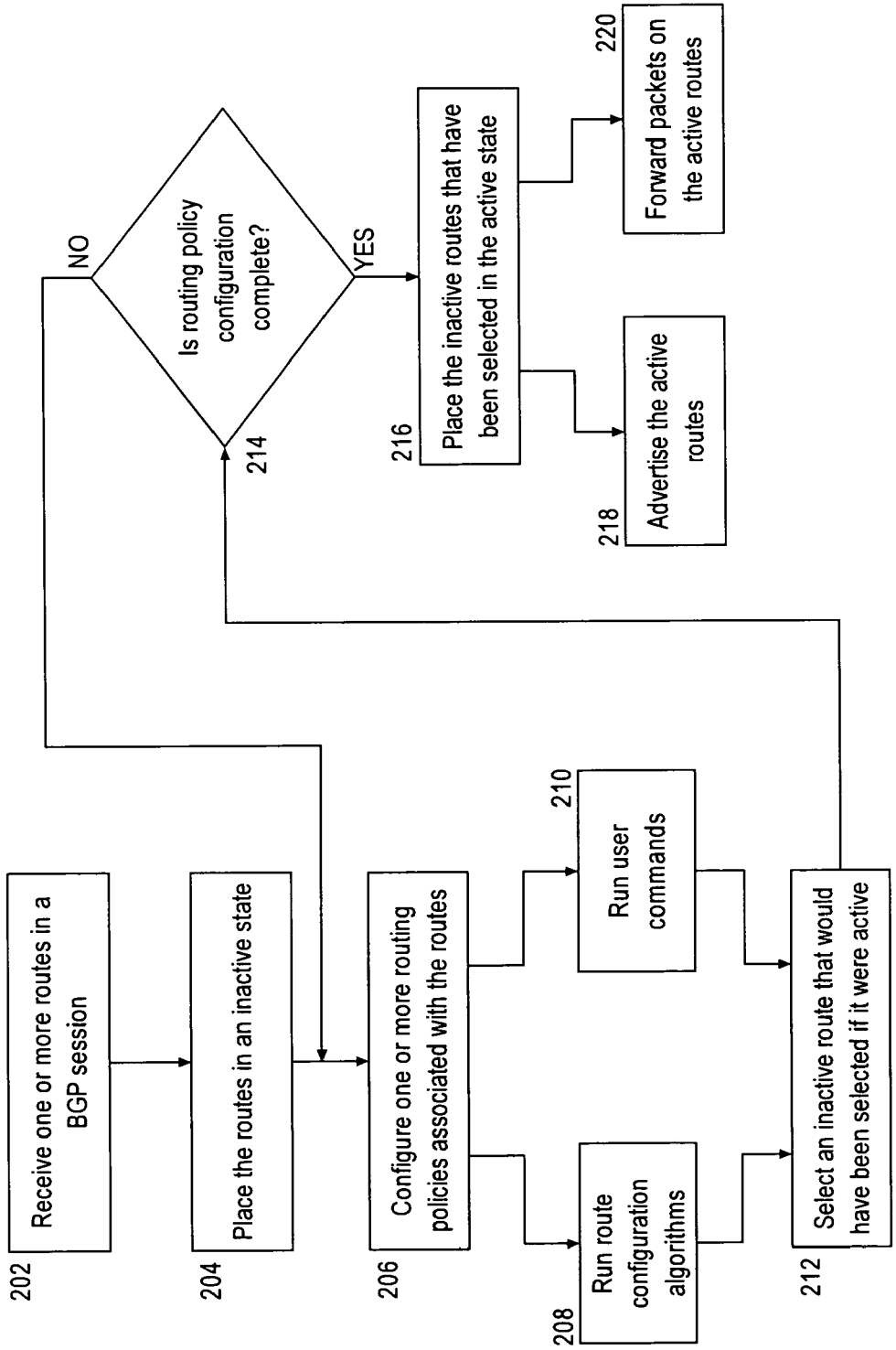
FIG. 2 is a flow diagram that illustrates a high level overview of one embodiment of a method for managing routes at a Border Gateway Protocol (BGP) host.

FIG. 2 is a flow diagram that illustrates a high level overview of one embodiment of a method for managing routes at a BGP host.

In step 202 the BGP host receives one or more routes. In step 204, the BGP host places the one or more routes in an inactive state, which indicates that packet forwarding is not allowed on any route in that state.

In step 206 one or more routing policies associated with the one or more routes are configured. Routing policy configuration may be performed by running route configuration and/or route selection algorithms in step 208. In addition, route configuration may be performed by running user commands received from a CLI or from another router management system. Steps 208 and 210 may be performed concurrently or in succession.

In step 212, an inactive route that would have been selected if it were active is selected from the one or more inactive routes. In other embodiments, step 212 may involve the performance of other actions, such as, for example, selecting a routing policy from a plurality of routing policies applied to the routes in the inactive state, or selecting a routing policy from a plurality of candidate policies based on the application of the policies to the inactive routes.

In step 214 a determination is made whether the routing policy configuration is complete. If routing policy configuration is not complete, the method continues in step 206 with configuring the routes further.

If routing policy configuration is complete, in step 216 the inactive routes are placed in an active state, which indicates that packet forwarding is allowed on any route in that state. In step 218, the active routes may be advertised to BGP peers of the BGP host, and in step 220 packet forwarding may be performed on the active routes.

3.0 Method for Route Management and Routing Policy Modeling 3.1 Defining Active and Inactive States for BGP Routes In one embodiment, routes received at a BGP host are placed in an inactive state. In this embodiment, packet forwarding is not allowed on any route that is in the inactive state. For example, routes may be placed in the inactive state in order to configure the routes or to model a routing policy, while at the same time making sure that packets will not be forwarded on the routes until the route configuration or routing policy modeling is completed.

Instead of, or in addition to, not allowing packet forwarding for routes in the inactive state, route advertising may also be disallowed for routes in the inactive state. Different embodiments may also define the inactive state by disallowing the performance of one or more actions that are associated with received or learned routes. The techniques described herein are not limited to any particular way of defining the inactive state or to disallowing the performance of any particular action associated with received or learned routes.

In one embodiment, routes received at a BGP host and placed in an inactive state may be placed in an active state after route configuration or routing policy modeling is completed. In this embodiment, packet forwarding is allowed on any route that is in the active state. For example, routes may be placed in the active state after the BGP host determines that the routes are properly configured or that one or more routing policies are satisfied.

Depending on how the inactive state is defined, route advertising may be allowed for routes in the active state in addition to, or instead of, allowing packet forwarding on routes in the active state. Different embodiments may also define the active state by allowing the performance of the one or more actions that are associated with received or learned routes and that were disallowed for routes in the inactive state. The techniques described herein are not limited to any particular way of defining the active state and may be closely associated with the way the inactive state is defined for a particular set of routes or for a particular BGP host.

In one embodiment, a BGP host may place in an active state one, some, or all of its routes that are in an inactive state. The techniques described herein are not limited to placing only a particular number of routes in the active state, and depend generally on the type of configuration that a BGP host performs on its inactive routes. Furthermore, the techniques described herein are not limited to operating on particular routes, and may be applied to any type of routes including, but not limited to, Internet Protocol version 4 (IPv4) routes, Internet Protocol version 6 (IPv6) routes, Internetwork Packet exchange (IPX) routes, Virtual Private Network (VPN) IPv4 routes, and VPN IPv6 routes.

In one embodiment, a BGP host places the routes it receives over a BGP session in an inactive state for the purpose of distinguishing the received routes from "live" routes that are used by the BGP host for forwarding packets. This allows the BGP host to configure the routes in the inactive state in a particular way and to compare them to the "live" routes. In this way, the BGP host may achieve a better understanding of what routes are being received over the BGP session and may take appropriate actions before actually forwarding packets on the routes. Furthermore, a user of the BGP host, such as a network engineer, can use CLI commands to retrieve information for both "live" and received but inactive routes. The user may use this information for a variety of purposes including, but not limited to, selecting a particular routing policy, setting appropriate configuration variables at the BGP host, and fine-tuning forwarding and route advertisement.

3.2 Implementing the Active and Inactive States

In one embodiment, a BGP host implements the active and inactive states of received or learned routes by associating the routes with an attribute that is stored with the routes. In this embodiment, for each stored route the value of the attribute indicates whether the route is in the active or inactive state. The value of the attribute may further be used to determine the set of routes on which to run route selection and/or route configuration algorithms. For example, based on the value of the attribute a BGP host may run one route selection algorithm on routes that are in the inactive state, and a different route selection algorithm on routes that are in the active state.

In this embodiment, since the BGP host uses the value of an attribute associated with each route to distinguish between active and inactive route, the BGP host may store active and inactive routes in the same physical and/or logical routing table. Furthermore, in this embodiment the BGP host may place the inactive routes in an active state by scanning the routing table and changing the value of the attribute for each route that needs to be activated.

In an embodiment, a BGP host may use separate physical and/or logical routing tables to store routes that are in the active state and routes that are in the inactive state. For example, a BGP host may use separate Adj-RIBs-In tables for routes in the active state and for routes in the inactive state. This allows a BGP host to apply different routing policies to active and inactive routes. In this way a BGP host may determine whether routes that are stored in the Loc-RIB table (which are usually routes selected from the active Adj-RIBs-In table) should be replaced with routes from the inactive Adj-RIBs-In table.

In one embodiment, a BGP host may receive routes over a BGP session with a peer that does not support routes in active and inactive states. The BGP host uses separate Adj-RIBs-In tables for routes that it places in active or inactive states. In this way, while the BGP host does not interfere with its BGP peer that does not distinguish between active and inactive routes, the BGP host still manages to configure the routes it receives over the BGP session before actually performing packet forwarding and/or route advertisement for the routes. Furthermore, by using separate tables for routes in the active and inactive states, the BGP host may silently discard any route updates for inactive routes that are received from the BGP peer during the session. In this way the BGP host may configure the routes in the inactive state and/or model a routing policy without disrupting the operation of the BGP peer that is not aware of routes in the active and inactive states.

In an embodiment, a BGP host may need to isolate active routes from inactive routes for the purpose of controlling redistribution of routes to routing protocols other than BGP. By using separate tables for routes in the active state and routes in the inactive state, the BGP host may better control which routes to redistribute immediately, which routes to distribute after reconfiguration, and which routes not redistribute at all.

In one embodiment, the BGP host may establish a session with a BGP peer that has the capability to manage routes in active and inactive states. In this embodiment, during the establishment of the BGP session the BGP host and the BGP peer may negotiate the capability to manage routes in active and inactive states by exchanging the appropriate CAPABILITIES parameters in BGP OPEN messages. Thereafter, the BGP peer and the BGP host may exchange routes in the inactive state in addition to the normal exchange of routes. The exchange of inactive routes may be implemented by using, in BGP UPDATE messages, a BGP COMMUNITIES attribute or any other BGP attribute or message specifically designated for exchanging inactive routes. For example, the BGP host may place one or more routes in an inactive state and may run route selection algorithms on them. While still keeping the routes in an inactive state, the BGP host may send some or all of the routes to the BGP peer. Upon receiving the routes, the BGP peer places the routes in an inactive state and may run the same or different route selection algorithms on them. Thus, the BGP peer may compare the results of its own route selection algorithms to the results of the route selection algorithms performed on the routes at the BGP host before the routes are used for actual packet forwarding.

3.3 Active and Inactive Route States for New and Existing BGP Sessions 3.3.1 Example Embodiments for New BGP Sessions In one embodiment, a BGP host places in an inactive state the routes it receives over a newly established session with a BGP peer. In this embodiment, depending on its capabilities and configuration, the BGP peer may or may not be aware that the routes it sends to the BGP host are placed in inactive state. The BGP host populates its Adj-RIBs-In table with the routes in the inactive state. The BGP host may also select some of these routes to populate its Loc-RIB table or its global RIB table that stores routes used by other routing protocols. The BGP host, however, does not populate its Adj-RIBs-Out table with, and/or does not forward packets on, the routes in the inactive state until it has configured these routes and/or has configured an appropriate routing policy.

In this embodiment, the BGP host may configure the routes in the inactive state or one or more routing policies, for example, by modifying one or more attributes associated with one or more of the routes or by filtering out some of the routes. When route or routing policy configuration is complete, the BGP host may place the one or more of the inactive routes in an active state, and may commence forwarding packets on them. The BGP host may also populate its Adj-RIBs-Out table with routes in the active state and may advertise these routes to its BGP peers.

3.3.2 Example Embodiments for Established BGP Sessions

In an embodiment, the BGP host may place in inactive state routes that it receives over an already established BGP session with a BGP peer. For example, the BGP host may request, over the session, some or all of its BGP peer's routes and place them in an inactive state. The BGP host may then run route selection algorithms on, and/or otherwise configure, the routes in the inactive state. Based on the results, the BGP host may decide to replace some of the routes it uses for routing and/or advertising by placing some or all of the inactive routes in an active state.

One mechanism that may be used to request routes from a BGP peer over an established BGP session is the Route-Refresh mechanism described in RFC2918, which was published by IETF in September 2000. According to this mechanism, a pair of BGP peers negotiates a Route-Refresh Capability during the establishment of a BGP session. Thereafter, each of the BGP peers in the pair may request and receive some or all of the routes of its peer in a BGP ROUTE-REFRESH message without the need to reset the existing BGP session.

In one embodiment, when a BGP host has an established BGP session with a BGP peer, the BGP host may use a new network address to establish an additional BGP session with the BGP peer. The BGP host may then treat the additional BGP session as a new BGP session and may place the routes it receives over this additional BGP session in the inactive state for route configuration and/or route policy modeling purposes. When route configuration and/or routing policy configuration for some or all of the routes in the inactive state is completed, the BGP host may replace or modify some of the routes received over the established BGP session by placing some or all of the inactive routes in an active state. In addition, the BGP host may also terminate or close the additional BGP session in order to preserve processing resources, such as, for example, memory, Central Processing Unit (CPU) time, and persistent storage space.

In an operational context for one embodiment, in an established session with a BGP peer, a BGP host is configured to receive over the session routes with address prefixes of a number of address families. Suppose, however, that the BGP host is not configured to receive routes of a specific address family over this established BGP session. According to this operational context, in this embodiment the BGP host may establish an additional BGP session with the BGP peer for the purpose of receiving over the session only routes of the specific address family. The BGP host may then place the routes of the specific address family in an inactive state, and may model or configure a routing policy for the routes of this specific address family. When routing policy modeling is complete, the BGP host may place the routes in the active state and may use the routes for packet forwarding and/or route advertisement. The BGP host may then be reconfigured to receive updates for the routes of the specific address family over the established BGP session along with routes of other address families, and may close the additional BGP session.

One mechanism that may be used to establish multiple BGP sessions for exchanging routes of particular address families is the Multisession BGP mechanism described in draft-ietf-idr-bgp-multisession-00.txt, which was submitted to the IETF in May 2004. The Multisession BGP mechanism is used in conjunction with the Multi-Protocol Extension to BGP-4 (MP-BGP) specification that is defined in RFC2858, which was published by IETF in June 2000. The MP-BGP specification enables BGP-4 to carry routing information for different address families that are defined by an Address Family Identifier (AFI) and a Subsequent Address Family Identifier (SAFI). According to the Multisession BGP mechanism, a pair of BGP peers negotiates a Multisession Capability during the establishment of a BGP session. Thereafter, in addition to the established BGP session the BGP peers may establish an additional BGP session for exchanging routes of a specific address family defined by a combination of an AFI value and a SAFI value.

3.4 Configuring Routes and Routing Policies in the Inactive State

In one embodiment, configuring routing policies associated with routes in an inactive state may comprise running one or more path selection algorithms to determine which routes would have been selected as "best" routes for forwarding had the routes been placed in an active state. The inactive routes selected this way may be flagged in order to make it easier to identify them when subsequently a decision is made to place inactive routes in an active state. For example, the selected inactive routes may be flagged as "would have been selected", and, depending on the implementation of the active and inactive states, may later be selected for activation by flagging them as active or by copying them to routing tables that store routes in the active state.

In an embodiment, configuring routing policies on routes in the inactive state may comprise running one or more route selection algorithms to determine which routes should be advertised to BGP peers. For example, a BGP host may store inactive routes in its Adj-RIBs-Out table, and may run one or more route selection algorithms to determine which inactive routes should be advertised to its BGP peers. The selected routes may then be flagged as "would have been advertised", and subsequently the BGP host may actually advertise the routes when the routes are placed in an active state.

In one embodiment, configuring routing policies on routes in the inactive state may comprise receiving commands from a user through a router management system, such as a Command Line Interface (CLI). The commands may include parameters that modify one or more attributes of the routes in the inactive state. For example, a network engineer may execute a CLI command on a BGP host in order to find out which routes in the active state have been advertised, and/or which routes in the inactive state have recently been received. The network engineer may also execute a command to compare and find any differences between routes in the active and the inactive states. The network engineer may also execute one or more commands to modify one or more attributes of one or more routes in the inactive state in order to test a particular route configuration without the risk of affecting packet forwarding or route advertisement. When the network engineer is satisfied that one or more routes in the inactive state are properly configured, the network engineer may execute a CLI command to place the one or more routes in the active state.

In an embodiment, configuring routing policies on routes in the inactive state may comprise applying a routing policy to one or more inactive routes. The routing policy may be applied in order to determine whether one or more attributes of a particular inactive route satisfy the parameters of the policy. As a result of applying the routing policy, the one or more attributes of the particular route may be modified according to the parameters of the policy. For example, depending on how the routing policy is defined, the one or more attributes may be modified if a condition associated with the policy is satisfied, or the attributes may be modified if a condition of the policy is not satisfied. Depending on the type of inactive routes and on the particular purpose of the routing policy, one or more parameters of the routing policy may also be modified. Furthermore, as a result of applying the routing policy to the one or more inactive routes, one or more of the routes may be filtered out, or dropped, if they are not compliant with the policy.

In one embodiment, configuring routing policies on routes in the inactive state may comprise applying different routing policies to the same inactive routes. For example, there may be a plurality of candidate routing polices that can be applied to one or more inactive routes. Different candidate routing policies may be applied to copies, or sets, of the same inactive routes in order to determine and select the best routing policy that will be used to govern packet forwarding on the one or more routes when the routes are placed in the active state. The application of the different candidate policies to the one or more inactive routes may be performed automatically by a BGP host, or may be performed in response to commands executed by a user on the BGP host.

4.0 Implementation Mechanisms—Hardware Overview

Figure 3:
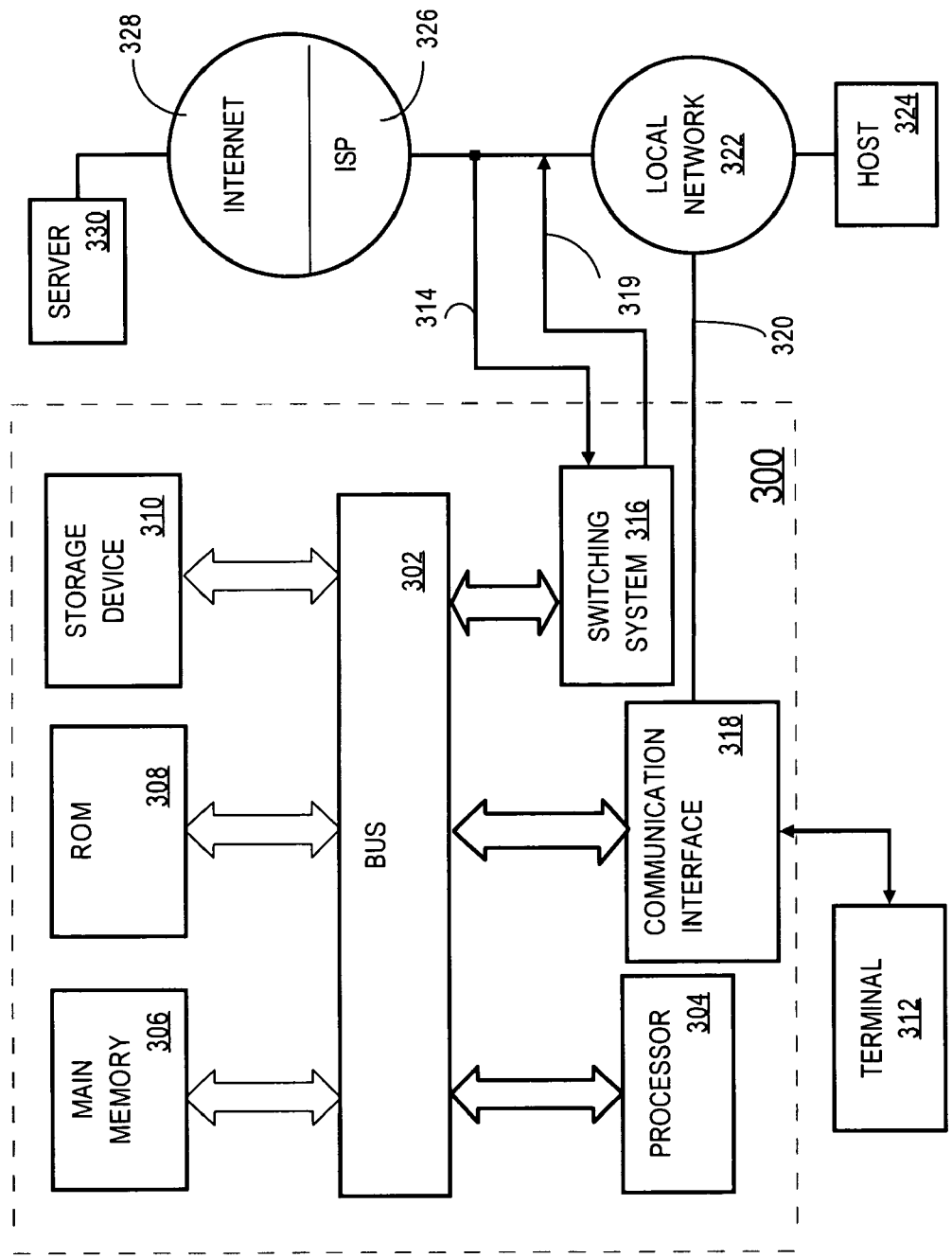
FIG. 3 is a block diagram that illustrates a computer system upon which an embodiment may be implemented.

FIG. 3 is a block diagram that illustrates a computer system 300 upon which an embodiment of the invention may be implemented. The preferred embodiment is implemented using one or more computer programs running on a network element such as a router device. Thus, in this embodiment, the computer system 300 is a router.

Computer system 300 includes a bus 302 or other communication mechanism for communicating information, and a processor 304 coupled with bus 302 for processing information. Computer system 300 also includes a main memory 306, such as a random access memory (RAM), flash memory, or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, flash memory or optical disk, is provided and coupled to bus 302 for storing information and instructions.

A communication interface 318 may be coupled to bus 302 for communicating information and command selections to processor 304. Interface 318 is a conventional serial interface such as an RS-232 or RS-422 interface. An external terminal 312 or other computer system connects to the computer system 300 and provides commands to it using the interface 314. Firmware or software running in the computer system 300 provides a terminal interface or character-based command interface so that external commands can be given to the computer system.

A switching system 316 is coupled to bus 302 and has an input interface 314 and an output interface 319 to one or more external network elements. The external network elements may include a local network 322 coupled to one or more hosts 324, or a global network such as Internet 328 having one or more servers 330. The switching system 316 switches information traffic arriving on input interface 314 to output interface 319 according to pre-determined protocols and conventions that are well known. For example, switching system 316, in cooperation with processor 304, can determine a destination of a packet of data arriving on input interface 314 and send it to the correct destination using output interface 319. The destinations may include host 324, server 330, other end stations, or other routing and switching devices in local network 322 or Internet 328.

The invention is related to the use of computer system 300 for BGP route management and routing policy modeling. According to one embodiment of the invention, BGP route management and routing policy modeling are provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Communication interface 318 also provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for BGP route management and routing policy modeling as described herein.

The received code may be executed by processor 304 as it is received, and/or stored in storage device 310, or other non-volatile storage for later execution.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of managing network routes at a Border Gateway Protocol (BGP) host, the method comprising the computer-implemented steps of:
the BGP host disallowing the performance of one or more actions that are associated with first one or more routes;
wherein the first one or more routes are stored in a BGP Routing Information Base (RIB) that stores only routes received over BGP;
the BGP host configuring two or more routing policies that are associated with the first one or more routes that are stored in the BGP RIB, wherein configuring the two or more routing policies comprises:
applying a first routing policy of the two or more routing policies to the first one or more routes, wherein applying the first routing policy comprises modifying one or more attributes of a particular route of the first one or more routes based on whether one or more conditions associated with the first routing policy of the two or more routing policies are satisfied;
storing second one or more routes at the BGP host, wherein the second one or more routes are the same as the first one or more routes; and
applying a second routing policy of the two or more routing policies to the second one or more routes, wherein the second routing policy is different than the first routing policy;
the BGP host allowing the performance of the one or more actions for the first one or more routes stored in the BGP RIB that have been configured according to one of the two or more routing policies.

2. A method as recited in claim 1, wherein the one or more actions comprise at least one of forwarding packets on the first one or more routes and advertising the first one or more routes to BGP peers of the BGP host.

3. A method as recited in claim 1, further comprising:
receiving the first one or more routes at the BGP host; and
storing the first one or more routes in the BGP RIB.

4. A method as recited in claim 3, wherein receiving the first one more routes comprises at least one of:
receiving the first one or more routes over a BGP session that is established between the BGP host and a BGP peer; and
receiving the first one or more routes over a routing protocol that is different than BGP.

5. A method as recited in claim 1, further comprising the step of charging a fee, to an entity that uses the BGP host, for forwarding network traffic of the entity on the first one or more routes.

6. A method of managing routes, the method comprising the computer-implemented steps of:
at a Border Gateway Protocol (BGP) host, establishing a BGP session with a BGP peer;
storing first one or more routes at the BGP host, wherein the first one or more routes are received over the BGP session;
the BGP host placing the first one or more routes in an inactive state, wherein packet forwarding is disallowed on any route that is in the inactive state;
wherein placing the first one or more routes in the inactive state comprises storing the first one or more routes in a first routing table;

the BGP host configuring two or more routing policies that are associated with the first one or more routes, wherein configuring the two or more routing policies comprises:
applying a first routing policy of the two or more routing policies to the first one or more routes, wherein applying the first routing policy comprises modifying one or more attributes of a particular route of the first one or more routes based on whether one or more conditions associated with the first routing policy of the two or more routing policies are satisfied;
storing second one or more routes at the BGP host, wherein the second one or more routes are the same as the first one or more routes; and
applying a second routing policy of the two or more routing policies to the second one or more routes, wherein the second routing policy is different than the first routing policy; and
the BGP host placing the first one or more routes in an active state, wherein packet forwarding is allowed on any route in the active state;
wherein placing the first one or more routes in the active state comprises storing the first one or more routes in a second routing table, wherein the second routing table is different than the first routing table.

7. A method as recited in claim 6, wherein:
route advertising is disallowed for any route in the inactive state; and
route advertising is allowed for any route in the active state.

8. A method as recited in claim 6, wherein:
the BGP session is a first BGP session;
the first one or more routes are received over the first BGP session; and
the method further comprises:
establishing a second BGP session between the BGP host and the BGP peer;
receiving the second one or more routes over the second BGP session; and
placing the second one or more routes in the active state.

9. A method as recited in claim 8, wherein configuring the two or more routing policies further comprises:
selecting a particular routing policy of the two or more routing policies based on information obtained as a result of applying at least the first and the second routing policies.

10. A method as recited in claim 6, wherein configuring the two or more routing policies further comprises:
selecting a particular routing policy from the two or more routing policies, wherein the particular routing policy is used to govern routing on the first one or more routes when the first one or more routes are placed in the active state.

11. A method as recited in claim 6, wherein configuring the two or more routing policies further comprises any one of:
modifying one or more attributes of a particular route of the first one or more routes according to the first routing policy of the two or more routing policies; and
filtering out a particular route of the first one or more routes based on the first routing policy of the two or more routing policies.

12. A method as recited in claim 6, wherein:
configuring the two or more routing policies comprises selecting a particular route of the first one or more routes based on one of the first routing policy and the second routing policy of the two or more routing policies; and
placing the first one or more routes in the active state comprises placing only the particular route in the active state.

13. A method as recited in claim 6, wherein configuring the two or more routing policies further comprises, in response to receiving a command from a user, modifying one or more attributes of a particular route of the first one or more routes based on a parameter included in the command.

14. A method as recited in claim 6, further comprising:
advertising the first one more routes to the BGP peer, wherein the first one or more routes are in the inactive state and have been configured according to the first routing policy;
at the BGP peer, receiving the first one or more routes and placing the first one or more routes in the inactive state; and
at the BGP peer, applying at least one routing policy of the two or more routing policies to the first one or more routes.

15. A method as recited in claim 6, wherein the steps of placing the first one or more routes in the inactive state and placing the first one or more routes in the active state comprise, for each route of the first one or more routes, changing the value of an attribute associated with each route.

16. A method as recited in claim 6, wherein:
the method comprises the computer-implemented step of the BGP host executing a BGP process;
establishing the BGP session with the BGP peer comprises the BGP process establishing the BGP session with the BGP peer;
storing the first one or more routes at the BGP host comprises the BGP process storing the first one or more routes in a BGP Routing Information Base (RIB), wherein the BGP RIB stores only routes that are received over BGP, and wherein the BGP RIB comprises the first routing table and the second routing table;
placing the first one or more routes in the inactive state comprises the BGP process placing the first one or more routes in the inactive state;
configuring the two or more routing policies comprises the BGP process configuring the two or more routing policies; and
placing the first one or more routes in the active state comprises the BGP process placing the first one or more routes in the active state.

17. An apparatus for routing that is operable to execute a Border Gateway Protocol (BGP) process, the apparatus comprising:
means for disallowing the performance of one or more actions that are associated with first one or more routes;
wherein the first one or more routes are stored in a BGP Routing Information Base (RIB) that stores only routes received over BGP;
means for configuring two or more routing policies that are associated with the first one or more routes that are stored in the BGP RIB, wherein the means for configuring the two or more routing policies comprise:
means for applying a first routing policy of the two or more routing policies to the first one or more routes;
means for storing second one or more routes at the BGP host, wherein the second one or more routes are the same as the first one or more routes; and
means for applying a second routing policy of the two or more routing policies to the second one or more routes, wherein the second routing policy is different than the first routing policy;
means for allowing the performance of the one or more actions for the first one or more routes stored in the BGP RIB that have been configured according to one of the two or more routing policies, wherein the means for configuring the two or more routing policies further comprise means for modifying one or more attributes of a particular route of the first one or more routes based on whether one or more conditions associated with the first routing policy of the two or more routing policies are satisfied.

18. An apparatus as recited in claim 17, wherein the one or more actions comprise at least one of forwarding packets on the first one or more routes and advertising the first one or more routes to peering BGP processes.

19. An apparatus as recited in claim 17, further comprising:
means for receiving the first one or more routes, wherein the first one or more routes are received over at least one of a BGP session and a routing protocol that is different than BGP; and
means for storing the first one or more routes in the BGP RIB.

20. An apparatus for routing, comprising:
one or more processors;
one or more stored sequences of instructions, which are stored in one or more volatile or non-volatile media and which, when executed by the one or more processors, are operable at least to:
execute a Border Gateway Protocol (BGP) process;
establish a BGP session with a BGP peer;
store first one or more routes, wherein the first one or more routes are received over the BGP session;
place the first one or more routes in an inactive state, wherein packet forwarding is disallowed on any route that is in the inactive state;
wherein the instructions operable to place the first one or more routes in the inactive state comprise instructions operable to store the first one or more routes in a first routing table;
configure two or more routing policies that are associated with the first one or more routes, wherein the instructions operable to configure the two or more routing policies comprise instructions operable to:
apply a first routing policy of the two or more routing policies to the first one or more routes, wherein applying the first routing policy comprises modifying one or more attributes of a particular route of the first one or more routes based on whether one or more conditions associated with the first routing policy of the two or more routing policies are satisfied;
store second one or more routes, wherein the second one or more routes are the same as the first one or more routes; and
apply a second routing policy of the two or more routing policies to the second one or more routes, wherein the second routing policy is different than the first routing policy; and
place the first one or more routes in an active state, wherein packet forwarding is allowed on any route in the active state;
wherein the instructions operable to place the first one or more routes in the active state comprise instructions operable to store the first one or more routes in a second routing table, wherein the second routing table is different than the first routing table.

21. An apparatus as recited in claim 20, wherein:
route advertising is disallowed for any route in the inactive state; and
route advertising is allowed for any route in the active state.

22. An apparatus as recited in claim 20, wherein:
the BGP session is a first BGP session;
the first one or more routes are received over the first BGP session; and
the one or more stored sequences of instructions further comprise instructions which are stored in the one or more volatile or non-volatile media and which, when executed by the one or more processors, are operable to:
establish a second BGP session with the BGP peer;
receive the second one or more routes over the second BGP session; and
place the second one or more routes in the active state.

23. An apparatus as recited in claim 22, wherein the instructions operable to configure the two or more routing policies comprise instructions which, when executed by the one or more processors, are operable to:
select a particular routing policy of the two or more routing policies based on information obtained as a result of applying at least the first and the second routing policies.

24. An apparatus as recited in claim 20, wherein the instructions operable to configure the two or more routing policies further comprise instructions which, when executed by the one or more processors, are operable to:
select a particular routing policy from the two or more routing policies, wherein the particular routing policy is used to govern routing on the first one or more routes when the first one or more routes are placed in the active state.

25. An apparatus as recited in claim 20, wherein the instructions operable to configure the two or more routing policies further comprise instructions which, when executed by the one or more processors, are operable to:
modify one or more attributes of a particular route of the first one or more routes according to the first routing policy of the two or more routing policies; and
filter out a particular route of the first one or more routes based on the first routing policy of the two or more routing policies.

26. An apparatus as recited in claim 20, wherein:
the instructions operable to configure the two or more routing policies comprise instructions which, when executed by the one or more processors, are operable to select a particular route of the first one or more routes based on one of the first routing policy and the second routing policy of the two or more routing policies; and
the instructions operable to place the first one or more routes in the active state comprise instructions which, when executed by the one or more processors, are operable to place only the particular route in the active state.

27. An apparatus as recited in claim 20, wherein the instructions operable to configure the two or more routing policies further comprise instructions which, when executed by the one or more processors, are operable to modify, in response to receiving a command from a user, one or more attributes of a particular route of the first one or more routes based on a parameter included in the command.

28. An apparatus as recited in claim 20, wherein the instructions operable to place the first one or more routes in the inactive state and the instructions operable to place the first one or more routes in the active state comprise instructions which, when executed by the one or more processors, are operable to change, for each route of the first one or more routes, the value of an attribute associated with each route.

29. An apparatus as recited in claim 20, wherein:
the instructions operable to establish the BGP session with the BGP peer are included in the instructions operable to execute the BGP process;
the instructions operable to store the first one or more routes at the BGP host are included in the instructions operable to execute the BGP process and further comprise instructions which, when executed by the one or more processors, are operable to store the first one or more routes in a BGP Routing Information Base (RIB), wherein the BGP RIB stores only routes that are received over BGP, and wherein the BGP RIB comprises the first routing table and the second routing table;
the instructions operable to place the first one or more routes in the inactive state are included in the instructions operable to execute the BGP process;
the instructions operable to configure the two or more routing policies are included in the instructions operable to execute the BGP process; and
the instructions operable to place the first one or more routes in the active state are included in the instructions operable to execute the BGP process.

30. A computer-readable storage medium storing one or more sequences of instructions for managing routes at a Border Gateway Protocol (BGP) host, which instructions, when executed by one or more processors, cause the one or more processors to perform the steps of:
establishing a BGP session with a BGP peer;
storing first one or more routes at the BGP host, wherein the first one or more routes are received over the BGP session;
placing the first one or more routes in an inactive state, wherein packet forwarding is disallowed on any route that is in the inactive state;
wherein placing the first one or more routes in the inactive state comprises storing the first one or more routes in a first routing table;
configuring two or more routing policies that are associated with the first one or more routes, wherein configuring the two or more routing policies comprises:
applying a first routing policy of the two or more routing policies to the first one or more routes, wherein applying the first routing policy comprises modifying one or more attributes of a particular route of the first one or more routes based on whether one or more conditions associated with the first routing policy of the two or more routing policies are satisfied;
storing second one or more routes at the BGP host, wherein the second one or more routes are the same as the first one or more routes; and
applying a second routing policy of the two or more routing policies to the second one or more routes, wherein the second routing policy is different than the first routing policy; and
placing the first one or more routes in an active state, wherein packet forwarding is allowed on any route in the active state;
wherein placing the first one or more routes in the active state comprises storing the first one or more routes in a second routing table, wherein the second routing table is different than the first routing table.

31. A computer-readable storage medium as recited in claim 30, wherein:
the one or more sequences of instructions further comprise instructions which, when executed by the one or more processors, cause the one or more processors to perform the step of executing a BGP process;
the instructions that cause the one or more processors to perform the step of establishing the BGP session with the BGP peer further comprise instructions which, when executed by the one or more processors, cause the one more processors to perform the step of the BGP process establishing the BGP session with the BGP peer;

the instructions that cause the one or more processors to perform the step of storing the first one or more routes at the BGP host further comprise instructions which, when executed by the one or more processors, cause the one more processors to perform the step of the BGP process storing the first one or more routes in a BGP Routing Information Base (RIB), wherein the BGP RIB stores only routes that are received over BGP, and wherein the BGP RIB comprises the first routing table and the second routing table;

the instructions that cause the one or more processors to perform the step of placing the first one or more routes in the inactive state further comprise instructions which, when executed by the one or more processors, cause the one more processors to perform the step of the BGP process placing the first one or more routes in the inactive state;

the instructions that cause the one or more processors to perform the step of configuring the two or more routing policies further comprise instructions which, when executed by the one or more processors, cause the one more processors to perform the step of the BGP process configuring the two or more routing policies; and the instructions that cause the one or more processors to perform the step of placing the first one or more routes in the active state further comprise instructions which, when executed by the one or more processors, cause the one more processors to perform the step of the BGP process placing the first one or more routes in the active state.

* * * * *

UNITED STATES PATENT AND TRADEMARK OFFICE
CERTIFICATE OF CORRECTION

| | |
|---|---|
| PATENT NO. | : 7,602,796 B2 |
| APPLICATION NO. | : 11/073351 |
| DATED | : October 13, 2009 |
| INVENTOR(S) | : Scudder et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1230 days.

Signed and Sealed this

Fifth Day of October, 2010

David J. Kappos
*Director of the United States Patent and Trademark Office*